United States Patent
Cable et al.

[15] 3,646,312
[45] Feb. 29, 1972

[54] ELECTRODES FOR WELDING AND THE LIKE

[72] Inventors: Harold Edward Cable, Thornburg; Herbert Edward Cable, Pittsburgh, both of Pa.

[73] Assignee: Weld Tooling Corporation, Pittsburgh, Pa.

[22] Filed: Sept. 1, 1970

[21] Appl. No.: 68,733

Related U.S. Application Data

[62] Division of Ser. No. 684,845, Nov. 21, 1971, Pat. No. 3,535,490.

[52] U.S. Cl. .................................219/146, 219/73, 219/126
[51] Int. Cl. .................................................................B23k 35/22
[58] Field of Search ..................................219/73, 126, 146

[56] References Cited

UNITED STATES PATENTS

| | | | |
|---|---|---|---|
| 2,948,805 | 8/1960 | Berg et al. | 219/137 |
| 3,365,566 | 1/1968 | Kuder | 219/160 |
| 3,352,993 | 11/1967 | Suzuki et al. | 219/73 |

Primary Examiner—J. V. Truhe
Assistant Examiner—Gale R. Peterson
Attorney—Buell, Blenko and Ziesenheim

[57] ABSTRACT

Welding electrodes are disclosed including an elongated ribbon or strip coated with insulating and fluxing material for close-fitting insertion in a gap between conductive plates or other shapes to be welded. The width of the electrode strip is substantially the same as the thickness of the members to be joined, while the thickness of the electrode is substantially equal to the width of the gap so that the gap is substantially filled when the electrode is inserted endwise through the gap. Very little electrode length need be subsequently inserted into the gap as welding proceeds to compensate for flux coating displacement and gap clearances. The electrode is coated with a glasslike or ceramic fluxing material having (e.g. for welding steel) a melting point above 900° F. The coating is a strong dielectric at lower temperatures but exhibits fluxing characteristics when molten at higher temperatures. The dielectric flux can be applied by dipping, spraying or painting, or by applying a sleeve of woven, matted or wrapped glass or glasslike fibers.

3 Claims, 11 Drawing Figures

INVENTORS
Harold Edward Cable and
Herbert Edward Cable.
BY
Buell Blenko & Ziesenheim
THEIR ATTORNEYS

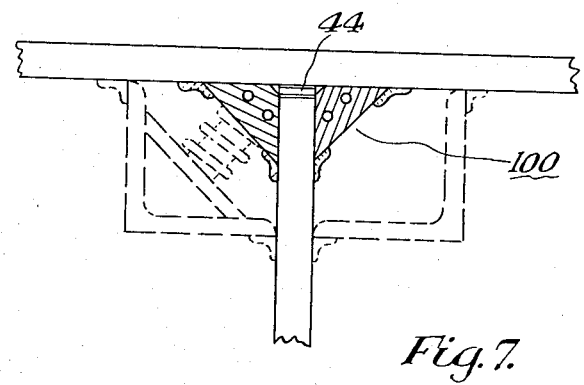
Fig. 7.
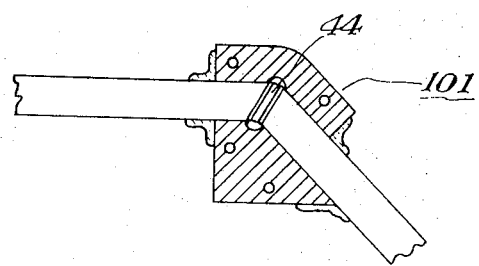
Fig. 8.
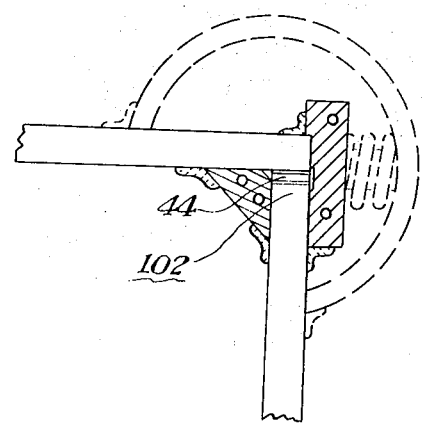
Fig. 9.
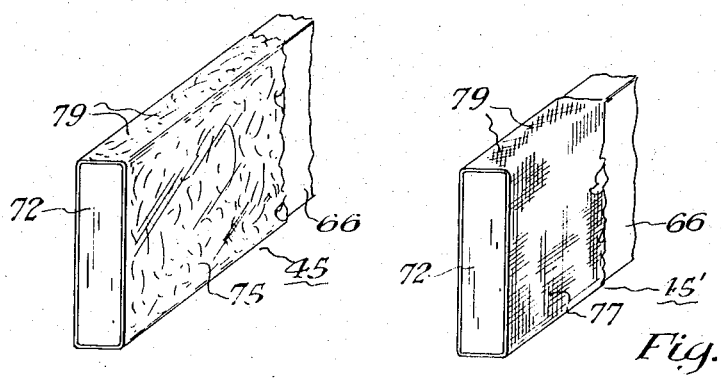
Fig. 6A.
Fig. 6B.

ELECTRODES FOR WELDING AND THE LIKE

This application is a division of our copending, coassigned application entitled Means and Methods for Welding and the Like and filed Nov. 21, 1967, Ser. No. 684,845, now U.S. Pat. No. 3,535,490, issued Oct. 20, 1970.

DESCRIPTION OF THE INVENTION

The present invention relates to electrodes for buttwelding and the like operations, and more particularly to the buttwelding of elongated seams or joints between steel plate and the like. Specifically, but not necessarily, certain arrangements of the invention are directed to the continuous welding of extremely elongated seams.

Various electrodes and apparatus for electric arc welding have been in use for many years. Unfortunately, conventional methods and apparatus for butt-welding relatively thick plates are very time consuming and sometimes relatively ineffective in that joints of insufficient strength are produced. It has been necessary to weld on both the forward and reverse sides of abutting plates along the junction therebetween in order to obtain sufficient weldment between the opposing edges of the plates. This results in a welded joint which is of substantially greater overall thickness than that of the plate. Frequently, when the weldment must be ground off flushly with the plate surfaces, the welded joint is intolerably weak owing to the lack of complete fusion of the weld metal in the gap or to porosity or slag inclusions in the weld metal in the area between the abutting plates. This process is further complicated where the junctions between the abutting plates are extremely long, and the joint being welded is subject to operational error in that too short or too long an arc may be established from time to time between the manually held welding electrode and the plates being joined. In those cases where the welding is done by automatic welding equipment, complicated and cumbersome mechanisms are required for tracking the electrode and for adjusting the rate of electrode feed along the length of the weld.

Conventional methods and apparatus for effecting abutment welds frequently necessitate beveling the adjacent edges of each of the abutting surfaces to be joined to form one or more grooves at the joint to permit penetration of molten metal into the area between the abutting surfaces.

Examples of the aforementioned conventional welding electrodes and procedures are evident in the U.S. Pat. Nos. to Turbyville, Jr. et al., No. 3,197,604 and Pease No. 2,938,107. In these prior welding operations, electrode wires are directed laterally into the weldment. The electrodes are substantially smaller in cross-sectional configuration in comparison with that of the weld joint. There is accordingly inadequate assurance that the weld joint will be completely filled with weld metal. In the Pease operation slagging or fluxing is not mentioned, while in Turbyville, Jr. et al. fluxing material is applied separately to the weld gap in advance of the welding electrodes.

The welding procedure of the patent to J. A. Lucey U.S. Pat. No. 3,337,712 is of greater interest to the problem of welding along an elongated weld gap. The Lucey Operation utilizes a consumable nozzle through which a movable electrode wire is passed. Lucey's improvement involves a variation in the formation of the nozzle itself, by substituting a bundle of laterally joined welding wires for the conventional tubular nozzle. In any event, the nozzle and electrode, whether formed according to the Lucey patent or otherwise, occupy less than about 65 percent of the gap volume as indicated in the patent. As the consumable nozzle is not fed into the gap, a great length of very small diameter electrode wire must be added throughout the welding operation to account for the requisite additional weld metal. Lucey does not contemplate an electrode which substantially fills the weld gap. Nor does he contemplate a combined fluxing and insulating coating such that the electrode can flushly engage the adjacent edges of a weld gap while maximizing the amount of weld metal which can be inserted into the gap. Moreover, assuming that the Lucey nozzle wires are coated with a fluxing material, the fluxing material is not confined principally to the edges of the molten pool adjacent the items being joined, where it is most effective and its total volume is minimized. Thus excessive fluxing material is required, and the volume of weld metal preinserted into the Lucey weld gap is correspondingly further reduced.

In those applications wherein the weld desirably is made under vacuum conditions, the aforedescribed disadvantages of conventional welding means and methods are considerably aggravated, as set forth in our aforesaid copending application. Owing at least in part to the lack of a suitable electrode structure, vacuum welding has not been feasible for use in the vast majority of repetitive or productional welding operations. Nevertheless, it is well known that vacuum welding or remelting considerably improves the quality of the finished metal. The use of vacuum in any welding operation removes gaseous contaminants from the weld area and produces superior welds, while the fitted electrode permits a reduction of heat input and of melted metal for a given joining cross section.

We overcome these disadvantages of conventional welding means and methods by the provision of unique welding electrodes which are particularly useful in welding the abutting edges of relatively thick steel and other metallic plate material where it is essential to provide thoroughly fused, continuous and nonporous weld metal between the plates and completely coextensive with their abutting edges. The disclosed welding electrodes are particularly useful for making elongated welds of the character described and for welding under vacuum conditions when required. We also provide novel means for preventing overheating of the plate material adjacent the weldment as the weld is being made and for limiting the thickness of the weldment. We also provide novel means for adding the required filler metal at maximum speed to the joint as the weld is being made and for simultaneously fluxing the joint, while minimizing the total heat input. With this arrangement weld metal can penetrate the junction without the necessity of beveling the edges of the parts to be joined. We also provide novel means for coating or encasing the electrode, with fluxing material such that the flux is continuously applied to the weld pool surfaces to eliminate any possibility of its occlusion in the weld metal. By using a flux, which is strongly dielectric at lower or nonwelding temperatures the electrode can completely fill the weld gap so that a long length of electrode need not subsequently be fed into the gap.

We accomplish these desirable results by providing a welding electrode comprising an elongated solid strip of weld filler metal, and a coating thereon which when solidified is electrically insulating and when molten is weld fluxing, said coa,ing covering at least those surfaces of said strip which are juxtaposable to surfaces of members to be joined by welding so that said coating is ;isposed adjacent the junctions of a molten weld pool with said member surfaces during a welding operation.

We also desirably provide a similar electrode wherein said electrode including said coating is shaped to fill substantially a weld gap between said members and for a flush but slidable engagement of said coating with juxtaposed surfaces of said members.

We also desirably provide a similar electrode wherein the length of said coated electrode lies within the range of 10 to 25 percent longer than the length of said weld gap.

We also desirably provide a similar electrode wherein said fluxing and insulating coating includes fiber glasslike fibrous material secured to said filler metal strip.

We also desirably provide welding apparatus wherein cooling means are coupled to said members adjacent said weld gap to chill said members and said electrode to minimize melting of said coating in advance of a weld pool produced during a welding operation.

We also desirably provide welding apparatus wherein said cooling means enclose both sides of said weld gap, sealing means are provided for sealing said cooling means to said members and for sealing the end of said gap opposite from the insertion point of said electrode, and a bellows or a slip packing or the like is sealed to said electrode and to said cooling means and said members to seal said gap and to permit a limited and sealed insertion of said electrode.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings, we have shown certain presently preferred embodiments of the invention and have illustrated certain presently preferred methods of practicing the same, wherein:

FIG. 6A is a partial, isometric view of still another modification of the electrode;

FIG. 6B is a similar view of a further modification of our welding electrode;

FIG. 7 is a cross-sectional view showing a further form of our wel;ing apparatus applied to T-joints;

FIG. 8 is a cross-sectional view showing a form of our welding apparatus applied to an angled butt joint; and FIG. 9 is a cross-sectional view showing a form of our apparatus applied to an edge butt.

Figure 1:
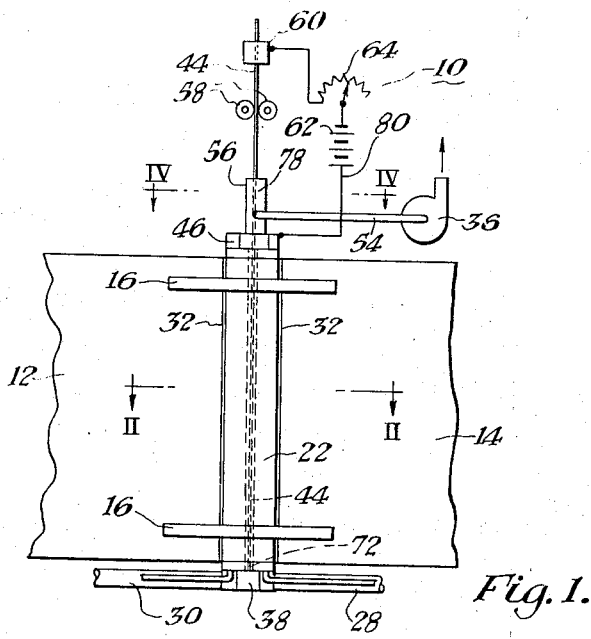
FIG. 1 is an elevational view of one form of welding apparatus utilizing a novel electrode of our invention.

Referring now to FIGS. 1–4 of the drawings in greater detail, one arrangement of our novel electrode 44 is illustrated in connection with welding apparatus 10 in this example for joining and butt welding a pair of relatively thick steel plates 12 and 14 or the like. The plates 12, 14 can be prepositioned for the welding operation by a plurality of steel "strongbacks" 16 spaced along the length of the joint therebetween on either or both of the forward and reverse sides of the plates as better shown in FIG. 2. The strongbacks 16 can be temporarily welded to the adjacent plate surfaces or otherwise rigidly secured to the plates. When the plates 12, 14 are thus positioned a gap 17 (FIG. 2) of predetermined width is established between their abutting edge faces 18, 20 respectively.

Figure 2:
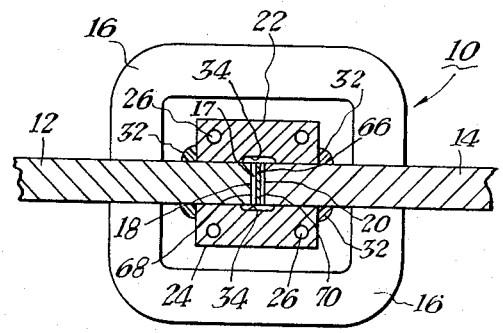
FIG. 2 is an enlarged, partial cross-sectional view of the apparatus and electrode shown in FIG. 1 and taken along reference line II—II thereof.

A pair of chill bars 22 and 24 can be utilized, if desired, and placed on both sides of the joint to be formed between the plates 12 and 14 as better shown in FIG. 2. The bars 22, 24, when used, preferably coextend with the length of the junction between the plates as shown in FIG. 1. The bars 22, 24 are fabricated from a good electrically and thermally conductive material, such as copper, to conduct excess heat from the juxtaposed portions of the plates 12 and 14 to promote weld solidification and reduce distortion. A path of high-electrical and thermal conductivity is thus established between the plates 12 and 14 by bars 22, 24. As described below, means are provided for urging the chill bars 22, 24 into substantially contiguous contact with the plates 12, 14 to bridge electrically the gap therebetween. Thus, the plates 12, 14 can be maintained substantially at the same potential during the welding process as described hereinafter. Other means, such as conductive straps (not shown) can, of course, be used instead.

Figure 3:
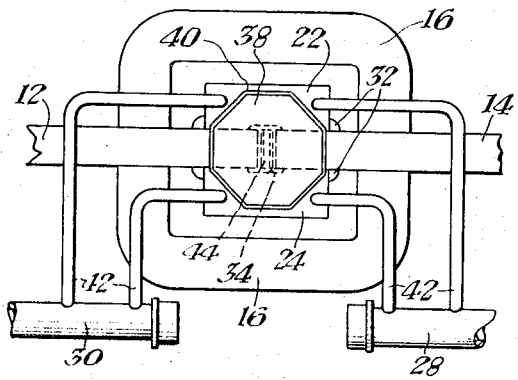
FIG. 3 is an enlarged, partial bottom plan view of the apparatus and electrode shown in FIG. 1.

Desirably, the heat transferred to the bars 22, 24 is dissipated by one or more longitudinal coolant passages 26 therein which are coupled adjacent the ends of the chill bars 22, 24 to supply and return headers 28 and 30 (FIG. 3). A suitable coolant fluid such as water is circulated through the passages 26 of chill bars 22, 24 throughout the welding operation. A thermostat or aquastat (not shown) can be coupled to one of the passages 26 and to a source of coolant fluid (not shown) to control the temperature of the chill bar or bars.

As illustrated in FIGS. 1 and 2 and as described in our aforesaid copending application, for vacuum welding operations each of the chill bars 22 and 24 can be provided with a pair of lateral sealing strips 32. As likewise shown in FIG. 2 each of the chill bars 22, 24 desirably is provided with a relatively shallow groove 34 extending longitudinally and intermediately of the side edges of the inward surface of the bar 22 or 24. The grooves 34 afford space for the collection and solidification of fused fluxing material, as described hereinafter, as the weldment progresses along the opposing edges 18, 20 of the plates 12, 14 and can also provide an avenue for the evacuation of the junction prior to welding or the edges 18, 20, when desired. If the gap is evacuated, a seal block 38 the outer edges of which are provided with a peripheral sealing strip 40 closes the lower end of the weld gap 17.

In any event the seal block is employed in striking the arc to commence the welding operation. As better shown in FIG. 3, the sealing block 38 and its strip 40 are encompassed by the end surfaces of the bars 22, 24 and the adjacent edge surfaces of plates 12, 14 which desirably are mounted flushly therewith. In this example, the sealing block 38 is of octagonal configuration to provide clearance for coolant channels 26 and their connecting conduits 42. Desirably the inner surface of the sealing or striking block 38 is in contiguous and electrical contact with at least one of the juxtaposed surfaces of the plates 12, 14 or of the chill bars 22, 24, if used, so that the block 38 can be employed for striking the arc from a preliminary and momentary engagement thereof by our novel electrode 44, the structure of which is described in detail hereinafter. If desired, a fuse of steel wool can be placed on the striking block to facilitate starting the arc.

The upper ends of the bars 22, 24 can be similarly sealed by upper sealing block 46 provided with a similar sealing lip 48. The upper sealing block 46, if used, is furnished with central aperture 50 to accommodate the passage of the electrode 44 and with lateral aperture 52 and associated conduit 54 which in turn can be connected to the aforementioned pump 36 when it is desired to evacuate the chamber thus formed. For vacuum welding, the upper sealing block 46 can be sealed to the movable electrode 44 by means of an elongated bellows 56 or a sliding seal.

The welding electrode 44 in this example passes between a pair of guide rollers 58 and is moved parallel to the juxtaposed plate edges 18, 20 by linear motor 60 or a hydraulic cylinder, pneumatic hammer, or other suitable servomechanism desirably actuated by a source of welding current including, for example, a variable voltage generator 62 with control 64. Thus, the rate of electrode insertion is made proportional to the welding arc voltage so that the electrode 44 is fed more or less rapidly depending upon the demand for filler metal.

Figure 5A:
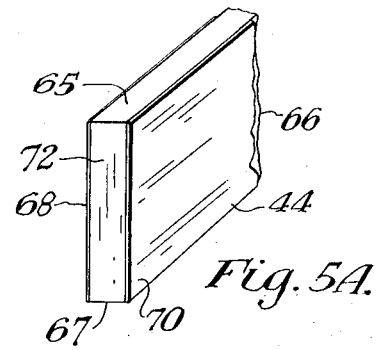
FIG. 5A is a partial, enlarged, isometric view of the welding electrode shown in the preceding figures.
Figure 4:
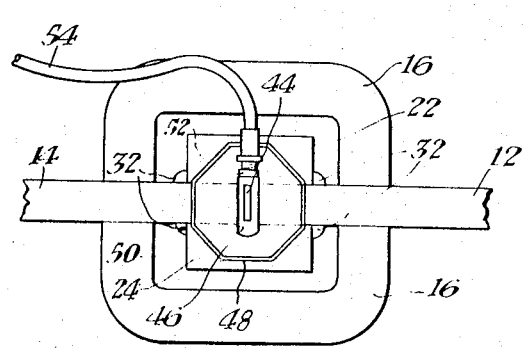
FIG. 4 is an enlarged, partial cross-sectional view of the apparatus and electrode shown in FIG. 1 and taken along reference line IV—IV thereof.
Figure 5B:
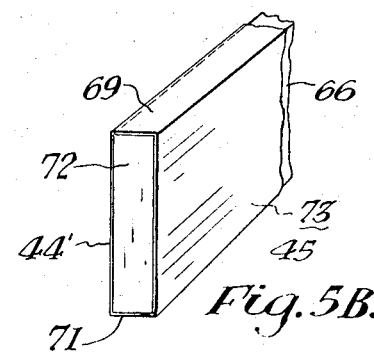
FIG. 5B is a similar view of a modified form of our novel welding electrode.

In this arrangement, the welding electrode 44, as better shown in FIGS. 2 and 5A includes a central strip 66 of compatible weld filler metal coated in this example on both side surfaces with layers 68 and 70 respectively of electrically insulating ceramic material such fluxing agent in a solid base or matrix. Desirably the insulating ceramic layers 68, 70 include a known fluxing agent such as lime, magnesia, and silica and can be of requisite thickness as determined by welding conditions such as welding voltage, thickness of plates 12, 14 and of the electrode strip 66. Typically the coatings are very thin and vary between ten and fifty mills in thickness. At these thicknesses the coatings exhibit excellent dielectric characteristics, such that the electrode 44 can completely fill the weld gap 17. For this purpose, the outer surfaces of the electrode coatings can seal flushly against the opposing edge surfaces 18, 20 of the items 12, 14 being welded without shortcircuiting the welding electrode 44. The thickness of the central metal strip 66 likewise can be varied and typically can have a thickness of about three thirty-seconds inch to about five-sixteenth inch, depending on the width of the weld gap 17. On the other hand the widths of the strip 66 and the coating layers 68, 70 desirably are made approximately equal to the adjacent thickness of the plates 12, 14 being joined. The metal strip 66, therefore, substantially fills the weld gap 17 such that a very little length of electrode 44 must be inserted into the gap 17 (FIG. 1) after welding commences. In most applications the length of electrode 44 is about 10 to 25 percent greater than the length of the junction between the plates 12, 14 being welded to supply the required weld metal.

Where added fluxing (and insulating) material is required per unit length of electrode strip, the edges thereof can also be coated with flux layers 69, 71 respectively, as shown in FIG. 5B. The electrode 44' can be formed by dipping painting or spraying of flux material on the metal ribbon or strip 66 so that a sheath 73 of the fluxing material completely insulates the lateral surfaces of the metallic ribbon 66'. An end 72 of the metallic strip 44 or 44' is left uncoated for the purposes discussed below.

Alternatively, as shown in FIGS. 6A and 6B, the fluxing material can be provided in the form of a sheath 75 or 77 through which the electrode ribbon 66 is inserted. The sheath 75 or 77 can be conveniently terminated short of the electrode contact 60 (FIG. 1) for the reasons noted below. In FIG. 6A, the sheath 75 is formed from glasslike fibers 79 which are gathered into a matlike formation to form the sheath 75. In FIG. 6B the fibers 79 are woven, by conventional techniques to form the fabric or textile sheath 77. The fibers 79 can be formed by extrusion after the manner of fiber glass from the fluxing compositions mentioned previously. It is to be noted that, in any of the electrode structures of FIGS. 5A, 5B, 6A and 6B, the electrode is electrically insulated from the juxtaposed surfaces of the members 12, 14 until the fluxing and insulating coating melts approximately at the advancing meltfront of the electrode.

When welding the plates 12, 14, which are positioned as aforestated by strongbacks 16 or other suitable means, the gap 17 between their opposing edges 18, 20 desirably is sized to receive closely the electrode 44 or 45 in its fully inserted position as shown in FIG. 1. The ribbon electrode 44 or 45 thus is closely and preferably contiguously confined within the gap between the plates 12, 14 save for the 10 to 25 percent thereof mentioned above and initially protruding upwardly from the gap (as viewed in FIG. 1) in the longitudinal direction thereof. To insure a proper width of such gap the electrode can be inserted between the opposing edges 18, 20 of the plates 12, 14 in easy fitting engagement before the strongbacks 16 are rigidly secured to the plates. Following this operation the chill bars 22, 24 and end sealing blocks 38, 46 can be added to the assembly if the joint is not to be evacuated in a suitable piece (not shown) of conductive material desirably is joined in place of the lower sealing block 38 (FIG. 1), as by tack welding, to aid in striking an arc at the bottom of the joint when the strip electrode 44 or 45 is fully and longitudinally inserted into the gap to make initial electrical contact.

The lower and bare end 72 (as viewed in FIG. 1) of the electrode 44 is uncoated as aforesaid with insulating material to permit striking the arc at the lower sealing block 38 or at a substitute conductive member (not shown), which is electrically connected to source 62 through the chill bars 22, 24 (if used) or plates 12, 14 and electrical contacts 78 and conductor 80. As described above the rate of movement of the electrode is made proportional to welding voltage to attain an optimum feed of filler metal. Desirably, the linear motor 60 or the like is reversible to permit withdrawing the electrode for example immediately after the arc is struck against the bottom sealing block 48 or a steel wool fuse or the like.

As the welding progresses, the arc is confined substantially to the unmelted end (i.e., the lower end as viewed in FIG. 1) of the electrode, but proceeds with sufficient rapidity that the dielectric fluxing and insulating material or coating does not melt substantially in advance of the arc front. Arcing occurs across the entire end of the electrode and thus substantially fills the width and thickness of the weld gap, 17. It is not necessary to move the electrode back and forth across the front of the advancing molten pool as in many conventional operations. Likewise, it is not necessary to rapidly feed a wire or rod-type electrode very rapidly in the expectation that the molten metal will flow laterally and hopefully fill the weldment as in other conventional procedures. In either type of conventional operation, the molten metal as pointed out earlier, frequently does not completely fill the weld gap so that the homogeneity of the weldment is less than desired. Further, the fluxing material frequently is not expelled in its entirety from the weldment but may be occluded to the detriment of weld strength. With our novel electrode, the proper location of the fluxing material in all respects to the electrode ribbon 66, and to the juxtaposed surfaces of the members 12, 14 to the arc front, not only minimizes the amount of required fluxing agent, but permits the fluxing agent to move entirely toward the outside or free lateral edges of the weld gap 17. When the chill bars 22, 24 are used, their grooves 34 facilitate collection and solidification of the expelled fluxing agent.

As pointed out previously the grooves 34 of the chill bars 22, 24 provide sufficient free area outwardly of the welded joint and on either side thereof to accommodate the melted flux composition which chills and solidifies against the bars 22, 24. On the other hand, the gap between the juxtaposed plate edges 18, 20 is completely filled by weld metal so that the cross section of the resultant weld will be equal to or only slightly greater than the thickness of the plates 12, 14.

For the current source 62, indicated schematically in FIG. 1, a welding generator of drooping voltage characteristic is most satisfactory for our novel welding arrangement. For most applications the plates 12, 14 or other members being joined are connected to the positive side of the arc, while the electrode 44 or 45 is connected to the negative side of the arc. With certain compositions of electrode metal 66 or with certain compositions of insulating and fluxing material, however, improved results can be obtained by reversing this polarity connection or by using an alternating current source.

Electrical contact can be made with the electrode 44, at the contact 60 (FIG. 1) by engagement thereof with the uncoated lateral edge surfaces 67, 69 (FIG. 5A). Similar contact can be made with the electrode 44' of FIG. 5B by terminating the flux and dielectric coating short of the contact 60, such that the coating completely covers only the lower end portion of the electrode (as viewed in FIG. 1). The latter arrangement is especially feasible with our novel electrode 44 (or 45, FIGS. 6A and 6B) as only 10 to 25 percent of the electrode length comprised within the weld gap 17 need be inserted after the arc is struck at the bottom of the gap. The fibrous sheath structures of fluxing material (FIG. 6A and 6B) likewise can be terminated short of the electrode contact 60 (FIG. 1) so that the contact directly engages the metallic ribbon 66.

The electrode 44 is fed downwardly (as viewed in FIG. 1) and relatively slowly into the molten pool, as the weld progresses upwardly so as to maintain a relatively uniform arc length at the weld front and to add a necessary but small amount of filler metal to complete the weldment. The electrode 44 most importantly is fed longitudinally through the gap between the members being welded. Initially the metallic ribbon 66 substantially fills the weld gap 17, so that only an added portion thereof is required to displace the thin coating of fluxing material as the weld progresses. It follows that the gap is entirely filled with weld metal for the strongest possible joint.

The arc voltage is varied and controlled so as to be compatible with the composition of the metals being joined, the thickness and temperature of the plates 12, 14 or other pieces, the configuration of the electrode 44 and the known flux composition utilized for the particular coating of flux material (FIGS. 5A–6B). The current through the electrode 44 or 45 therefore is at the maximum which the electrode can carry without excessive softening from internal resistance heating and without loss of dielectric strength of the flux material coated thereon. This permits the welding to progress at the maximum rate while ensuring proper but minimum fusion of the adjacent plate edges 18, 20. Desirably, the temperature of the coolant fluid passing through the chill bars 22, 24 is thermostatically controlled (not shown), to attain a proper rate of slag solidification and appropriate fusion of the weld metal without undercutting the plate edges 18, 20. The chill bars, when used, also minimize any melting of the flux coating at points removed from the immediate area of the weld front.

Our novel electrode 44 can be fabricated from any appropriate compatible composition customarily used in making welding electrodes. The electrode 44 or 45 permits filler metal to be inserted from a direction diametrically opposed to that of the moving weld front so that a maximum of fused metal is disposed directly between the juxtaposed plate edges 18, 20 to ensure a weldment of maximum strength. More particularly, our novel welding electrodes permit fused metal to be inserted directly in a narrow gap between plates or other relatively thin members.

With our novel welding electrodes as shown in the aforementioned drawings, a large variety of welds can now be made in a controlled atmosphere or otherwise. As noted in out copending application, the use of a controlled atmosphere removes gaseous contaminants from the immediate welding area to produce a superior weld and to minimize further the heat input and consumption of filler metal. The effectiveness but relative simplicity of our novel electrodes permit the use of vacuum welding techniques in many common welding applications not hitherto possible. Moreover, our novel electrodes can be used for a variety of welding situations, with or without vacuum techniques, as shown in FIGS. 7–9 which demonstrate the use of our novel electrode 44 at tee, angle and corner gaps 100, 101, and 102 respectively.

From the foregoing it will be apparent that novel and efficient forms of Electrodes for Welding and the like have been disclosed. While we have shown and described certain presently preferred embodiments of the invention and have illustrated presently preferred methods of practicing the same, it is to be distinctly understood that the invention is not limited thereto but may be variously embodied and practiced within the spirit and scope of the invention.

We claim:

1. A welding electrode comprising an elongated solid strip of weld filler metal, and a fluxing and insulating coating thereon which when solidified is electrically insulating and when molten is weld fluxing, said coating covering at least those surfaces of said strip which are juxtaposable to surfaces of members to be joined by welding so that said coating is disposed adjacent the junctions of a molten weld pool with said member surfaces during a welding operation, cooling means coupled to said members adjacent said weld gap to chill said members and said electrode to minimize melting of said coating in advance of a weld pool produced during a welding operation said cooling means being closely spaced to said weld gap and including collecting means juxtaposed to said gap for collecting and solidifying the fluxing and insulating coating which is melted during said welding operation, said cooling means enclosing both sides of said weld gap, sealing means sealing said cooling means to said members and sealing the end of said gap opposite from the insertion point of said electrode, and a bellows sealed to said electrode and to said cooling means and said members to seal said gap and to permit a limited and sealed insertion of said electrode.

2. The combination according to claim 1 wherein said fluxing and insulating coating includes fiberglasslike fibrous material surrounding and secured to said filler metal strip.

3. The combination according to claim 1 wherein said fibrous material is matted or woven to form a fibrous sleeve through which said elongated strip is inserted.

* * * * *